United States Patent
Koreeda et al.

(10) Patent No.: US 11,336,056 B2
(45) Date of Patent: May 17, 2022

(54) CONNECTOR DEVICE, CONNECTOR AND MATING CONNECTOR

(71) Applicant: JAPAN AVIATION ELECTRONICS INDUSTRY, LIMITED, Tokyo (JP)

(72) Inventors: Yuichi Koreeda, Tokyo (JP); Masaki Ishiguro, Tokyo (JP); Hideto Shimazu, Tokyo (JP); Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 17/044,978

(22) PCT Filed: Apr. 3, 2019

(86) PCT No.: PCT/JP2019/014739
§ 371 (c)(1),
(2) Date: Oct. 2, 2020

(87) PCT Pub. No.: WO2019/244438
PCT Pub. Date: Dec. 26, 2019

(65) Prior Publication Data
US 2021/0167553 A1    Jun. 3, 2021

(30) Foreign Application Priority Data
Jun. 19, 2018 (JP) .............................. JP2018-116026

(51) Int. Cl.
*H01R 13/639* (2006.01)
*H01R 13/64* (2006.01)
(Continued)

(52) U.S. Cl.
CPC ......... *H01R 13/639* (2013.01); *G02B 6/3893* (2013.01); *G02B 6/3897* (2013.01);
(Continued)

(58) Field of Classification Search
CPC .. H01R 13/639; H01R 13/64; H01R 13/6582; H01R 24/40; H01R 24/76; H01R 13/62;
(Continued)

(56) References Cited

U.S. PATENT DOCUMENTS 7,008,254 B2   3/2006   Matsunaga et al.
7,033,201 B2   4/2006   Ichida et al.
(Continued)

FOREIGN PATENT DOCUMENTS

CN   1645683 A   7/2005
CN   1658442 A   8/2005
(Continued)

OTHER PUBLICATIONS

Extended European Search Report in EP 19823208.4, dated Jun. 15, 2021.
(Continued)

*Primary Examiner* — Abdullah A Riyami
*Assistant Examiner* — Justin M Kratt
(74) *Attorney, Agent, or Firm* — Collar & Roe, P.C.

(57) ABSTRACT

A connector device comprises a connector and a mating connector. Under a mated state where the connector and the mating connector are mated with each other, the mating connector is positioned forward of the connector in a front-rear direction. The connector comprises at least one supporting portion, at least one lock portion and a receiving portion. The mating connector has at least one mating lock portion and an abutment portion. At least one of the lock portion and the mating lock portion has an intersecting surface which intersects with both the front-rear direction and a perpendicular direction. Under the mated state, the abutment portion is positioned forward beyond the receiving portion in the front-rear direction and is brought into abutment against the receiving portion by a rearward force so (Continued)

that a rearward movement of the abutment portion beyond the receiving portion is regulated by the receiving portion.

15 Claims, 11 Drawing Sheets

(51) Int. Cl.
| | |
|---|---|
| *H01R 13/6582* | (2011.01) |
| *H01R 24/40* | (2011.01) |
| *G02B 6/38* | (2006.01) |
| *H01R 24/76* | (2011.01) |
| *H01R 13/62* | (2006.01) |
| *H01R 13/627* | (2006.01) |
| *G02B 6/42* | (2006.01) |

(52) U.S. Cl.
CPC ......... *H01R 13/64* (2013.01); *H01R 13/6582* (2013.01); *H01R 24/40* (2013.01); *H01R 24/76* (2013.01); *G02B 6/3817* (2013.01); *G02B 6/4292* (2013.01); *G02B 6/4293* (2013.01); *H01R 13/62* (2013.01); *H01R 13/627* (2013.01); *H01R 13/6277* (2013.01)

(58) Field of Classification Search
CPC ............... H01R 13/627; H01R 13/629; H01R 13/6277; G02B 6/3893; G02B 6/3897; G02B 6/3817; G02B 6/4292; G02B 6/4293; G02B 6/4284
See application file for complete search history.

(56) References Cited

U.S. PATENT DOCUMENTS

| | | |
|---|---|---|
| 7,500,864 B2 | 3/2009 | Mase et al. |
| 9,684,135 B2 | 6/2017 | Mori et al. |
| 10,587,078 B2 | 3/2020 | Friesen |
| 2009/0130887 A1 | 5/2009 | Guilbert et al. |
| 2019/0013618 A1 | 1/2019 | Barbet et al. |

FOREIGN PATENT DOCUMENTS

| | | | |
|---|---|---|---|
| CN | 101141032 A | | 3/2008 |
| CN | 105637715 A | | 6/2016 |
| CN | 107919562 A | | 4/2018 |
| DE | 44 39 852 A1 | | 5/1996 |
| DE | 10 2016 111458 A1 | | 12/2017 |
| FR | 2 923 956 A1 | | 5/2009 |
| JP | 2002-198127 A | | 7/2002 |
| JP | 2005-005135 A | | 1/2005 |
| JP | 2005005135 A | * | 1/2005 |
| JP | 2005-251653 A | | 9/2005 |
| JP | 2008-140744 A | | 6/2008 |
| WO | 2008/128940 A1 | | 10/2008 |
| WO | 2017-133838 A | | 8/2017 |

OTHER PUBLICATIONS

Chinese Office Action in CN 201980027451.5, dated Jul. 2, 2021.
International Search Report in PCT/JP2019/014739, dated Jul. 2, 2019.
Japanese Office Action in JP 2018-116026, dated Jun. 19, 2019.

* cited by examiner

CONNECTOR DEVICE, CONNECTOR AND MATING CONNECTOR

CROSS REFERENCE TO RELATED APPLICATIONS

This application is the National Stage of PCT/JP2019/014739 filed on Apr. 3, 2020, which claims priority under 35 U.S.C. § 119 of Japanese Application No. 2018-116026 filed on Jun. 19, 2018, the disclosure of which is incorporated by reference. The international application under PCT article 21(2) was not published in English.

TECHNICAL FIELD

This invention relates to a connector device, and to a connector and a mating connector which are used for the connector device.

BACKGROUND ART

Referring to FIGS. 20 and 21, Patent Document 1 discloses a connector device 900 comprising a connector 910 and a mating connector 950. The mating connector 950 is mateable with and removable from the connector 910 along a front-rear direction (X-direction). The connector 910 has a lock hole 922, a lock portion 924, a supporting portion 920, a hood portion accommodation portion 926 and a front retainer 928. The lock portion 924 is a surface of the lock hole 922 which faces rearward (in a negative X-direction). The supporting portion 920 has an elastic property and supports the lock portion 924. The lock portion 924 is movable in a perpendicular direction (in a Z-direction) perpendicular to the front-rear direction by an elastic deformation of the supporting portion 920. The hood portion accommodation portion 926 is a space extending in the front-rear direction. The mating connector 950 has a mating lock protrusion 960, a mating lock portion 962, a hood portion 965 and a front retainer accommodation portion 968. The mating lock portion 962 is a front surface (positive X-side surface) of the mating lock protrusion 960.

A mating operation of the connector 910 with the mating connector 950 is performed as described below. The connector 910 and the mating connector 950 are firstly arranged as shown in FIG. 20, and the connector 910 and the mating connector 950 are moved to approach each other in the front-rear direction. Then, the hood portion accommodation portion 926 of the connector 910 accommodates the hood portion 965 of the mating connector 950, and a front end portion (positive X-side end portion) of the supporting portion 920 of the connector 910 is brought into abutment against the mating lock protrusion 960 of the mating connector 950. This causes the supporting portion 920 of the connector 910 to be elastically deformed so that the front end portion of the supporting portion 920 rides on the mating lock protrusion 960 of the mating connector 950. When the connector 910 and the mating connector 950 are further moved to approach each other in the front-rear direction after that, the supporting portion 920 of the connector 910 restores its original shape while the mating lock protrusion 960 of the mating connector 950 is accommodated in the lock hole 922 of the connector 910. In other words, the connector 910 and the mating connector 950 reach a mated state where the connector 910 and the mating connector 950 are mated with each other as shown in FIG. 21. Under the mated state where the connector 910 and the mating connector 950 are mated with each other, the mating connector 950 is positioned forward (in a positive X-direction) of the connector 910 in the front-rear direction.

PRIOR ART DOCUMENTS

Patent Document(s)

Patent Document 1: JP A 2002-198127

SUMMARY OF INVENTION

Technical Problem

Under the mated state where the connector 910 and the mating connector 950 are mated with each other, the connector device 900 of Patent Document 1 has a clearance 980 between a rear end 927 of the hood portion accommodation portion 926 of the connector 910 and a rear end 966 of the hood portion 965 of the mating connector 950 in the front-rear direction, or in a mating direction. Additionally, under the mated state where the connector 910 and the mating connector 950 are mated with each other, the connector device 900 of Patent Document 1 has a clearance 990 between a front end 929 of the front retainer 928 of the connector 910 and a front end 969 of the front retainer accommodation portion 968 of the mating connector 950 in the mating direction. Accordingly, if an external force in the mating direction (in the front-rear direction) is applied to the connector 910 or to the mating connector 950 under the mated state where the connector 910 and the mating connector 950 are mated with each other, the connector 910 might be moved relative to the mating connector 950 in the mating direction (in the front-rear direction) and thereby the connector device 900 might have a degraded connection therebetween.

It is therefore an object of the present invention to provide a connector device which prevents a connector from being moved in a mating direction relative to a mating connector even if an external force in the mating direction is applied to the connector or to the mating connector under a mated state where the connector and the mating connector are mated with each other.

Solution to Problem

An aspect of the present invention provides a connector device comprising a connector and a mating connector. The mating connector is mateable with and removable from the connector along a front-rear direction. Under a mated state where the connector and the mating connector are mated with each other, the mating connector is positioned forward of the connector in the front-rear direction. The connector comprises at least one supporting portion, at least one lock portion and a receiving portion. The supporting portion has an elastic property and supports the lock portion. The lock portion is movable at least in a perpendicular direction by an elastic deformation of the supporting portion. The perpendicular direction is perpendicular to the front-rear direction. The mating connector has at least one mating lock portion and an abutment portion. A relative position between the mating lock portion and the abutment portion in the front-rear direction is fixed in the mating connector. At least one of the lock portion and the mating lock portion has an intersecting surface which intersects with both the front-rear direction and the perpendicular direction. Under the mated state, the lock portion is pressed against the mating lock portion by the elasticity of the supporting portion at the intersecting surface to apply a rearward force in the front-rear direction to the mating lock portion. Under the mated state, the abutment portion is positioned forward beyond the receiving portion in the front-rear direction and is brought into abutment against the receiving portion by the rearward force so that a rearward movement of the abutment portion beyond the receiving portion is regulated by the receiving portion.

Advantageous Effects of Invention

The connector device of the present invention is configured as follows: under the mated state where the connector and the mating connector are mated with each other, the lock portion of the connector applies the rearward force to the mating lock portion of the mating connector; and, under the mated state, the abutment portion of the mating connector is brought into abutment against the receiving portion of the connector by the rearward force so that the rearward movement of the abutment portion beyond the receiving portion is regulated by the receiving portion. Accordingly, the connector device of the present invention is configured to prevent the connector from being moved in a mating direction relative to the mating connector even if an external force in the mating direction is applied to the connector or to the mating connector under the mated state where the connector and the mating connector are mated with each other. Thus, the connector device of the present invention can maintain a stable connection therebetween under the mated state where the connector and the mating connector are mated with each other.

An appreciation of the objectives of the present invention and a more complete understanding of its structure may be had by studying the following description of the preferred embodiment and by referring to the accompanying drawings.

DESCRIPTION OF EMBODIMENTS

Figures 1, 2:
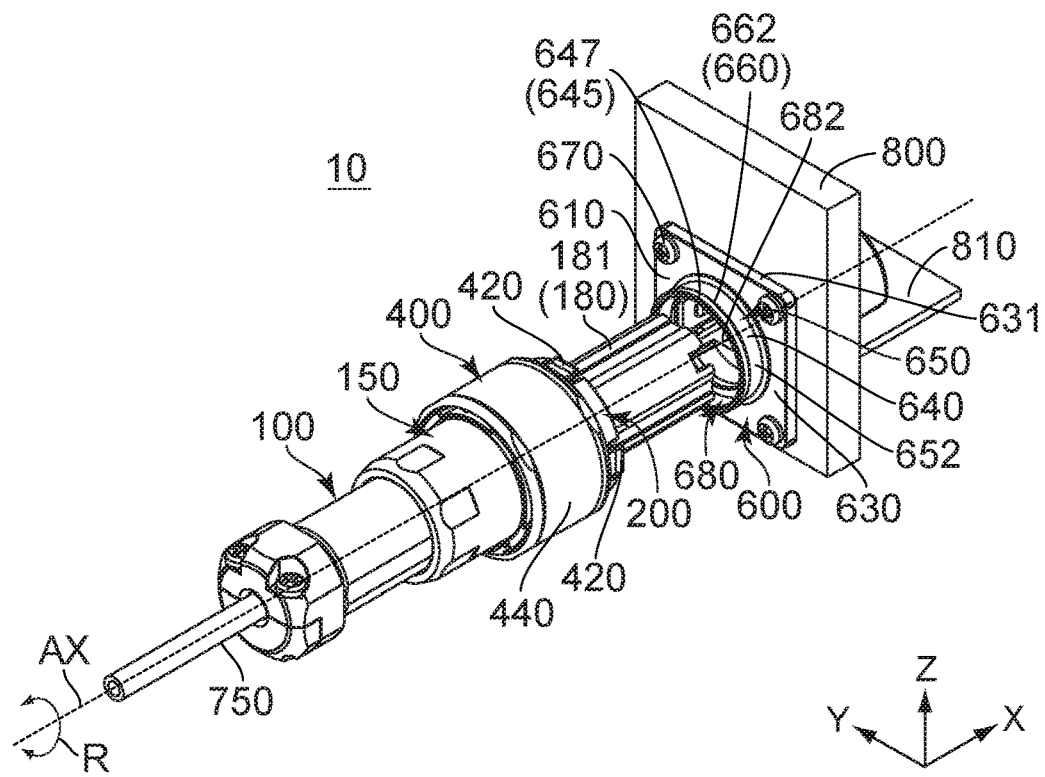
FIG. 1 is a perspective view showing a connector device according to an embodiment of the present invention. In the figure, a connector and a mating connector are not mated with each other.
FIG. 2 is a rear view showing the connector device of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

As shown in FIG. 1, a connector device 10 according to an embodiment of the present invention comprises a mating connector 600 and a connector 100. In other words, the mating connector 600 of the present embodiment is used for the connector device 10. In addition, the connector 100 of the present embodiment is used for the connector device 10.

Figure 11:
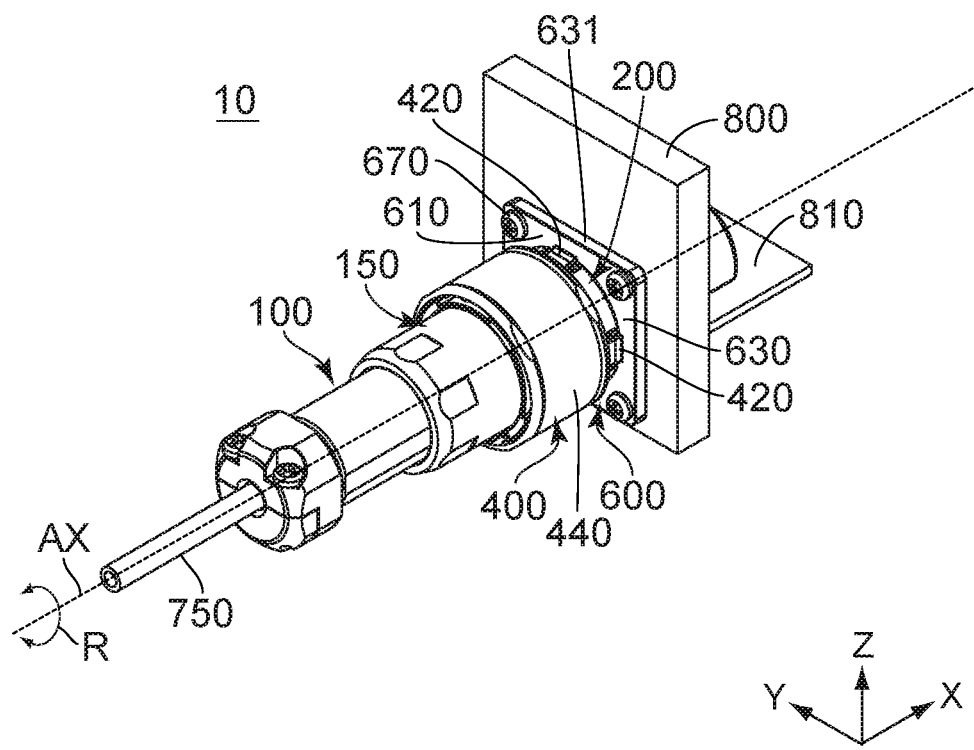
FIG. 11 is another perspective view showing the connector device of FIG. 1. In the figure, the connector and the mating connector are in a first mated state. In the figure, a lock portion of the connector is pressed against a mating lock portion of the mating connector while a maintaining mechanism of the connector device does not press a supporting portion of the lock member of the connector.
Figure 12:
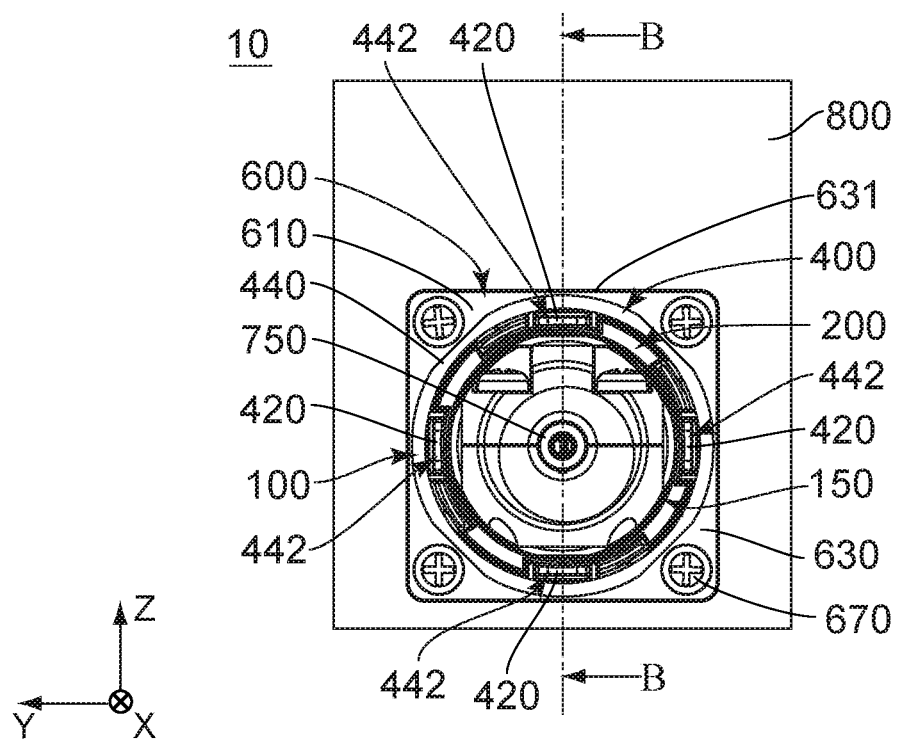
FIG. 12 is a rear view showing the connector device of FIG. 11.
Figure 16:
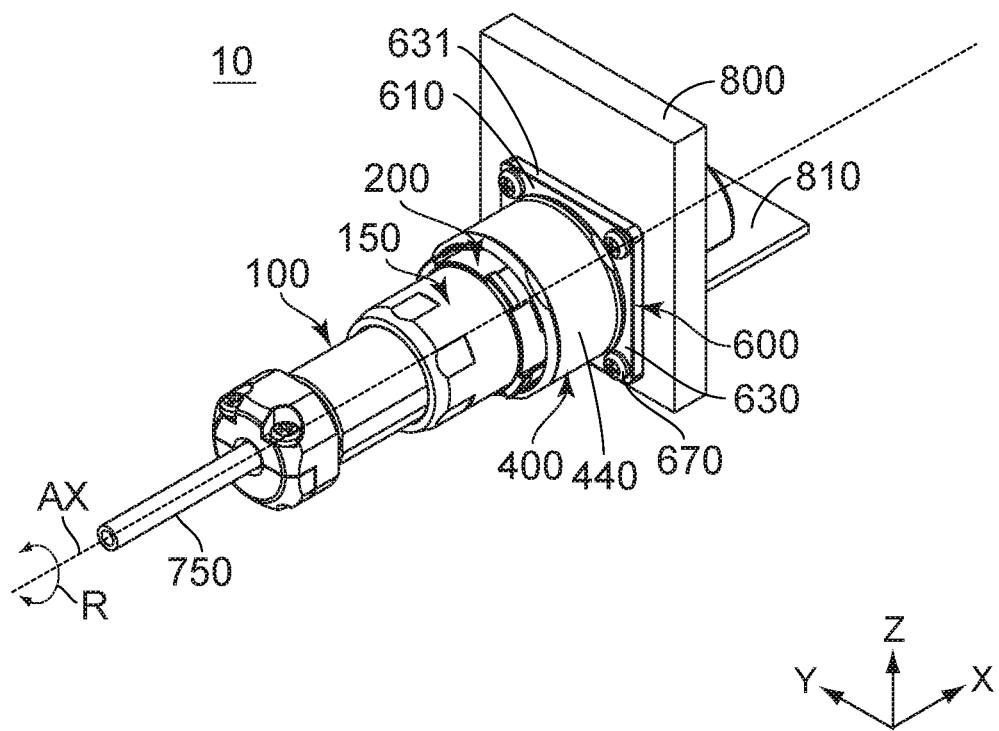
FIG. 16 is yet another perspective view showing the connector device of FIG. 1. In the figure, the connector and the mating connector are in a second mated state. In the figure, the maintaining mechanism of the connector device presses the supporting portion of the lock member of the connector.
Figure 17:
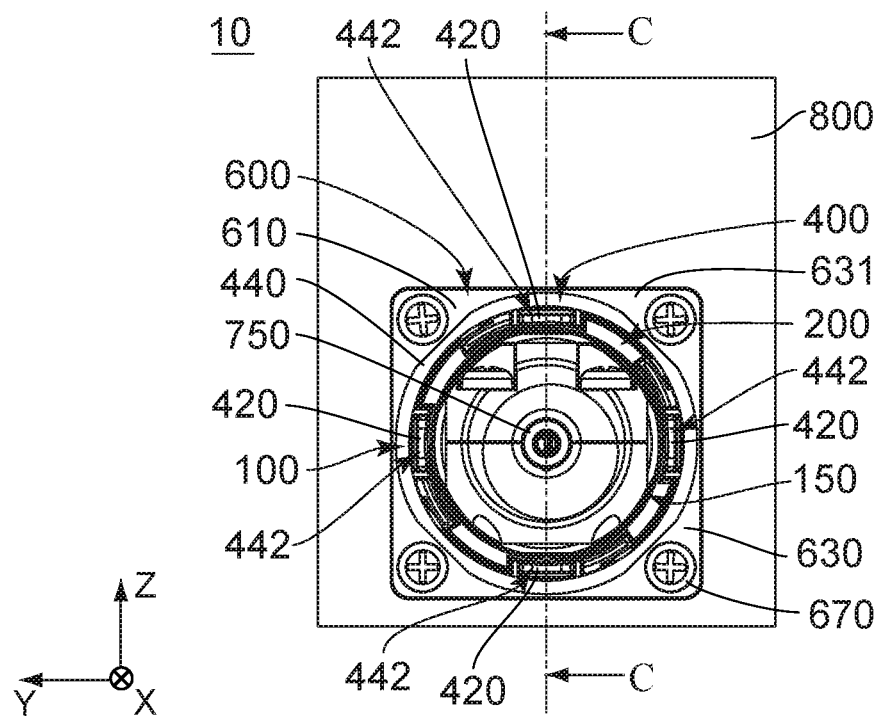
FIG. 17 is a rear view showing the connector device of FIG. 16.

As shown in FIGS. 1, 11 and 16, the mating connector 600 according to the present embodiment is mateable with and removable from the connector 100 along a front-rear direction. In the present embodiment, the front-rear direction is an X-direction. Specifically, it is assumed that forward is a positive X-direction while rearward is a negative X-direction.

Figure 4:
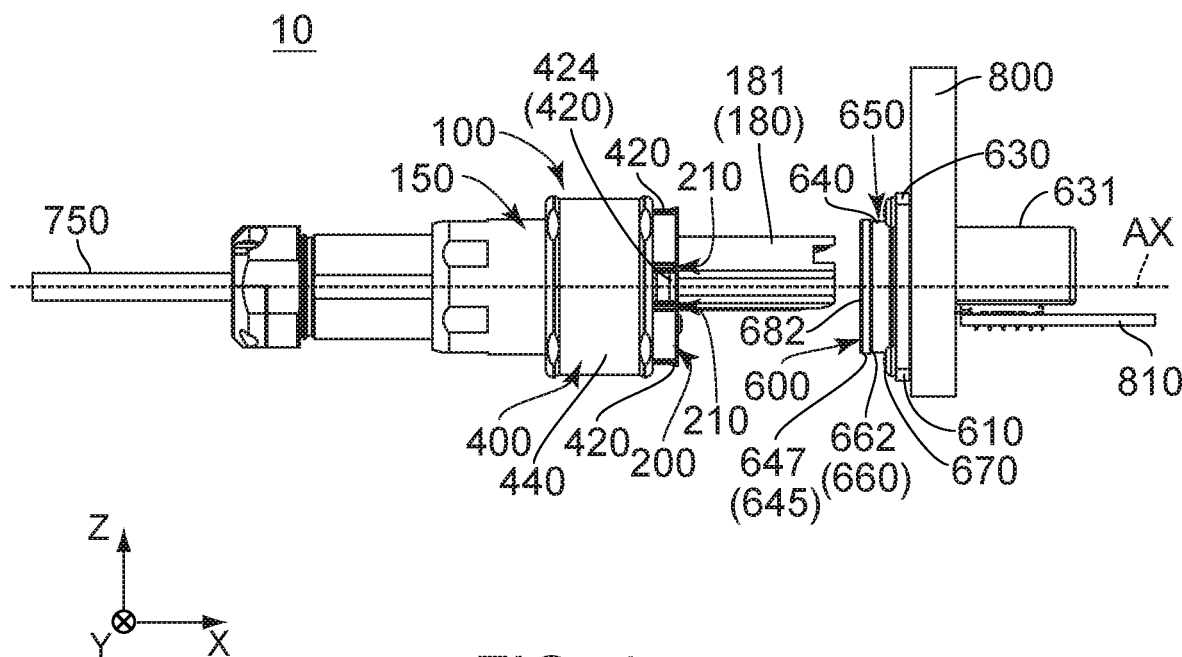
FIG. 4 is a side view showing the connector device of FIG. 1.

As shown in FIG. 4, the mating connector 600 according to the present embodiment comprises a mating connector body 610 and fixing screws 670.

Figure 3:
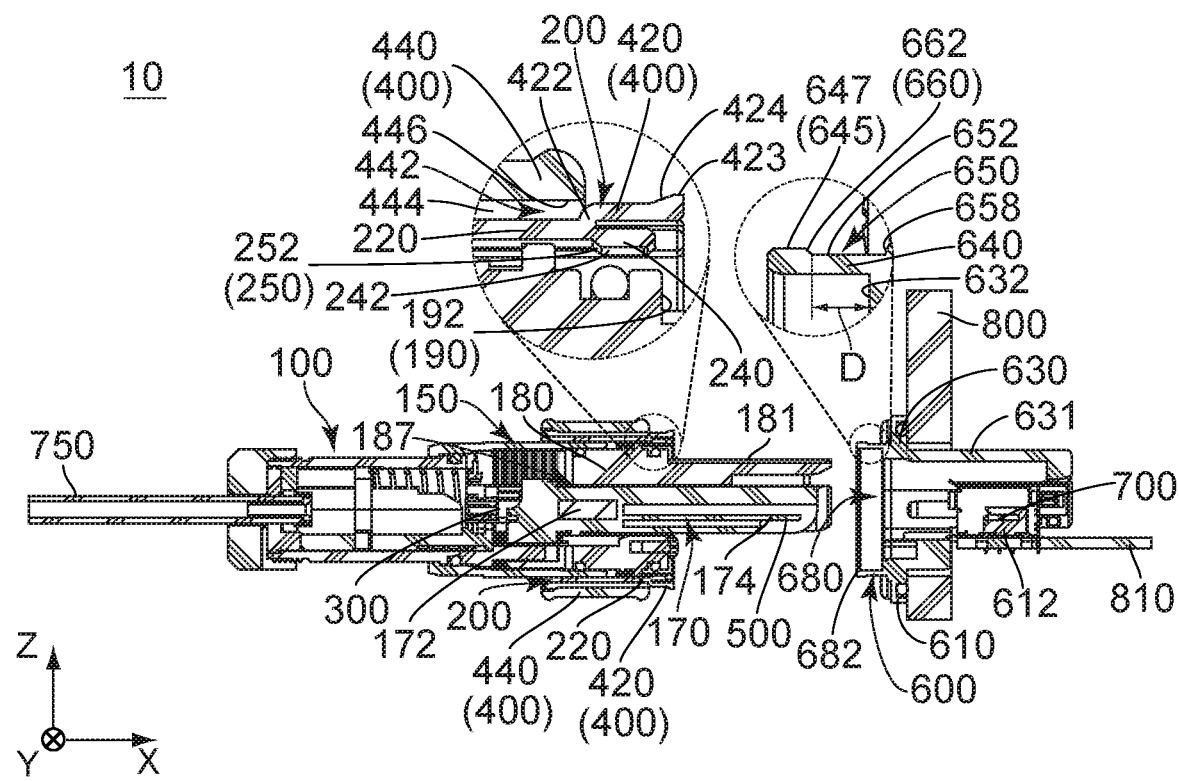
FIG. 3 is a cross-sectional view showing the connector device of FIG. 2, taken along line A-A. In the figure, parts of the connector and the mating connector are illustrated enlarged.

As shown in FIG. 3, the mating connector body 610 of the present embodiment has a mating shell 630, a cover portion accommodation portion 680 and a mating electrical connector 612.

As shown in FIG. 1, the mating shell 630 of the present embodiment is attached to a housing 800 when the connector device 10 is used. More specifically, the mating shell 630 is attached to an outer surface of the housing 800 by the fixing screws 670 when the connector device 10 is used.

As shown in FIG. 3, the mating shell 630 of the present embodiment has a mating shell body 631 and a mating protruding portion 640.

As showing in FIG. 3, the mating shell body 631 of the present embodiment extends inside and outside the housing 800 in the front-rear direction. As shown in FIG. 1, the mating shell body 631 is attached to the housing 800 by the fixing screws 670 so that a rear end portion of the mating shell body 631 is positioned outside the housing 800.

As shown in FIG. 3, the mating shell body 631 of the present embodiment is formed with an abutment portion 632. In other words, the mating shell 630 of the present embodiment is formed with the abutment portion 632. The abutment portion 632 is a surface perpendicular to the front-rear direction. The abutment portion 632 faces rearward in the front-rear direction.

As shown in FIG. 1, the mating protruding portion 640 of the present embodiment has a substantially cylindrical tube shape which has a center on an axis AX extending in the front-rear direction. The mating protruding portion 640 is positioned rearward of the mating shell body 631 in the front-rear direction. The mating protruding portion 640 is provided so as to be positioned outside the housing 800 when the mating shell 630 is attached to the housing 800. As shown in FIG. 3, the mating protruding portion 640 is positioned outward of the abutment portion 632 of the mating shell body 631 in a perpendicular direction perpendicular to the front-rear direction. In other words, the abutment portion 632 of the mating shell body 631 extends inward in the perpendicular direction from the mating protruding portion 640. In the present embodiment, the perpendicular direction is a radial direction of a circle which is located on a plane perpendicular to the axis AX and which has a center on the axis AX.

As shown in FIG. 3, the mating protruding portion 640 of the present embodiment has a recess 650 and a bulge 645. In other words, the mating connector 600 of the present embodiment has the recess 650.

As shown in FIG. 3, the recess 650 of the present embodiment is opened outward in the perpendicular direction. In other words, the recess 650 is recessed inward in the perpendicular direction. The recess 650 is positioned forward of the bulge 645 in the front-rear direction. The recess 650 is provided on an outer surface, in the perpendicular direction, of the substantially cylindrical tube shape of the mating protruding portion 640. A front end of the recess 650 is coupled with the mating shell body 631 in the front-rear direction.

As shown in FIG. 3, an inner surface of the recess 650 of the present embodiment consists of three surfaces, namely, a front surface 658, a rear surface 662 and a bottom surface 652. The front surface 658 faces outward in the perpendicular direction and rearward in the front-rear direction. The front surface 658 is positioned forward of the bottom surface 652 in the front-rear direction. The rear surface 662 faces outward in the perpendicular direction and forward in the front-rear direction. The bottom surface 652 is a surface perpendicular to the perpendicular direction. The bottom surface 652 faces outward in the perpendicular direction. The bottom surface 652 is positioned forward of the rear surface 662 in the front-rear direction. The bottom surface 652 couples the front surface 658 and the rear surface 662 with each other in the front-rear direction.

As shown in FIG. 3, the recess 650 of the present embodiment is provided with mating lock portions 660. In other words, the mating lock portions 660 of the present embodiment are provided on the recess 650. Specifically, the mating lock portions 660 are provided on a rear portion of the recess 650.

As described above, in the present embodiment, the mating connector 600 comprises the mating connector body 610, the mating shell body 631 is formed with the abutment portion 632, and the recess 650 is provided with the mating lock portions 660. In other words, the mating connector 600 according to the present embodiment comprises the mating connector body 610, the mating lock portions 660 and the abutment portion 632. However, the present invention is not limited thereto. The mating connector 600 should comprise at least one of the mating lock portion 660 and the abutment portion 632.

As shown in FIG. 3, a relative position between each of the mating lock portions 660 and the abutment portion 632 in the front-rear direction is fixed in the mating connector 600 of the present embodiment. More specifically, in the mating connector 600 of the present embodiment, each of the mating lock portions 660 is positioned rearward of the abutment portion 632 in the front-rear direction, and the mating lock portions 660 and the abutment portion 632 are fixed so that each of the mating lock portions 660 is spaced apart from the abutment portion 632 by a distance D in the front-rear direction.

As shown in FIG. 3, each of the mating lock portions 660 of the present embodiment has an intersecting surface 662.

As shown in FIG. 3, the intersecting surface 662 of the mating lock portion 660 of the present embodiment faces outward in the perpendicular direction and forward in the front-rear direction. The intersecting surface 662 of the mating lock portion 660 is also the rear surface 662 of the recess 650. In other words, the intersecting surface 662 of the mating lock portion 660 is one of the surfaces of the recess 650.

As shown in FIG. 3, the bulge 645 of the present embodiment is positioned rearward of the recess 650 in the front-rear direction. The bulge 645 defines a rear end of the mating protruding portion 640 in the front-rear direction. In other words, the bulge 645 defines a rear end of the mating shell 630 in the front-rear direction. The bulge 645 is tapered so as to have a decreasing dimension toward a rear end thereof.

As shown in FIG. 3, the bulge 645 of the present embodiment has an outer surface 647 and an end surface 662.

As shown in FIG. 3, the outer surface 647 of the present embodiment is a surface perpendicular to the perpendicular direction. The outer surface 647 faces outward in the perpendicular direction. The outer surface 647 is positioned outward beyond the bottom surface 652 of the recess 650 in the perpendicular direction.

As shown in FIG. 3, the end surface 662 of the present embodiment faces outward in the perpendicular direction and forward in the front-rear direction. The end surface 662 of the bulge 645 is the rear surface 662 of the recess 650. In other words, the end surface 662 of the bulge 645 is also the intersecting surface 662 of the mating lock portion 660.

As shown in FIG. 3, the cover portion accommodation portion 680 of the present embodiment is a space extending forward from a rear end of the mating connector body 610. The cover portion accommodation portion 680 has an opening 682 at a rear end thereof.

As shown in FIG. 3, the mating electrical connector 612 of the present embodiment is fixed on a circuit board 810, which is arranged in the housing 800, when the connector device 10 is used.

As shown in FIG. 3, the mating electrical connector 612 of the present embodiment has mating terminals 700. In other words, the mating connector 600 of the present embodiment has the mating terminals 700. Each of the mating terminals 700 of the present embodiment is made of metal.

As shown in FIGS. 1, 11 and 16, the connector 100 of the present embodiment is mateable with and removable from the mating connector 600 along the front-rear direction.

As shown in FIG. 3, the connector 100 of the present embodiment comprises a connector body 150, a lock member 200 and a pressing member 440.

As shown in FIG. 3, the connector body 150 of the present embodiment comprises a holding member 180, an optical connector 300 and an optical module 170.

Figure 5:
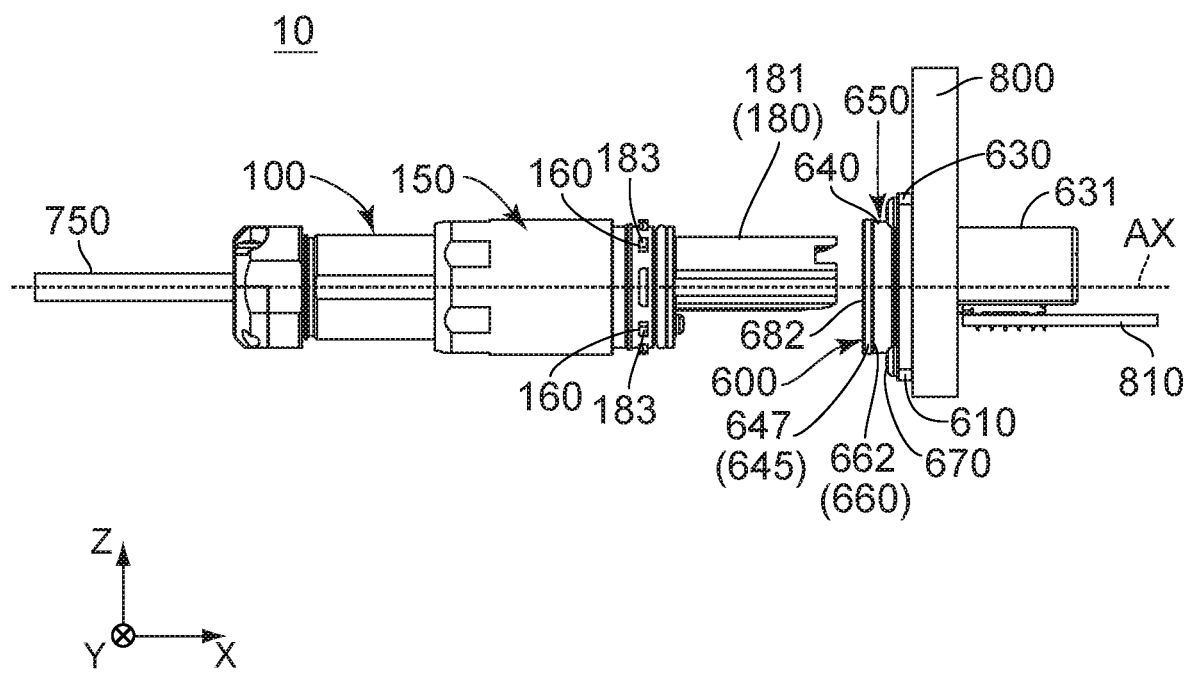
FIG. 5 is another side view showing the connector device of FIG. 4. In the figure, a pressing member and a lock member, which are included in the connector of the connector device, are omitted.

Referring to FIGS. 3 and 5, the holding member 180 of the present embodiment is made of insulator. Specifically, the holding member 180 has a cover portion 181, an extending portion 190, protrusions 183, regulating portions 160 and an optical module accommodation portion 187. In other words, the connector body 150 of the present embodiment is provided with the regulating portions 160.

Referring to FIGS. 1 and 3, the cover portion 181 of the present embodiment has a substantially rectangular half tube shape which extends in the front-rear direction and which is opened downward. The cover portion 181 defines a front end of the holding member 180.

As shown in FIG. 3, the extending portion 190 of the present embodiment extends in a direction perpendicular to the front-rear direction. The extending portion 190 is positioned rearward of the cover portion 181 in the front-rear direction. The extending portion 190 is positioned outward of the cover portion 181 in the perpendicular direction. The extending portion 190 has a front surface 192 which faces forward in the front-rear direction. The front surface 192 of the extending portion 190 is a surface perpendicular to the front-rear direction. The front surface 192 of the extending portion 190 faces forward in the front-rear direction. The front surface 192 of the extending portion 190 functions as a receiving portion 192. In other words, the connector 100 comprises the receiving portion 192.

As shown in FIG. 5, each of the protrusions 183 of the present embodiment protrudes outward in the perpendicular direction. Referring to FIGS. 3 and 5, each of the protrusions 183 is positioned rearward of the extending portion 190 in the front-rear direction. Each of the protrusions 183 is positioned outward of the extending portion 190 in the perpendicular direction. Each of the protrusions 183 has a rear surface 160. The rear surface 160 of the protrusion 183 is a surface perpendicular to the front-rear direction. The rear surface 160 of the protrusion 183 faces rearward in the front-rear direction. The rear surface 160 of the protrusion 183 functions as the regulating portion 160.

As shown in FIG. 3, the optical module accommodation portion 187 of the present embodiment is a hole which pierces the holding member 180 in the front-rear direction and which has a substantially rectangular tube shape. The optical module 170 is accommodated in the optical module accommodation portion 187. Specifically, the holding member 180 of the present embodiment holds the optical module 170.

As shown in FIG. 3, the optical connector 300 of the present embodiment is configured to connects an optical fiber cable 750 with the optical module 170. Specifically, the optical connector 300 is attached to the optical fiber cable 750. In addition, the optical connector 300 is configured to be attachable with and detachable from the optical module 170.

As shown in FIG. 3, the optical module 170 of the present embodiment has a photoelectric conversion portion 172 and an electrical connector 174.

Referring to FIG. 3, the photoelectric conversion portion 172 of the present embodiment converts optical signals to electrical signals and vice versa between the optical connector 300 and the electrical connector 174.

Referring to FIG. 3, the electrical connector 174 of the present embodiment receives electrical signals from the photoelectric conversion portion 172 and outputs electrical signals to the photoelectric conversion portion 172. The electrical connector 174 of the present embodiment has terminals 500. In other words, the connector 100 of the present embodiment has the terminals 500. Each of the terminals 500 of the present embodiment is made of metal.

As shown in FIG. 3, the lock member 200 of the present embodiment is attached to the connector body 150. More specifically, the lock member 200 is attached to an outer periphery, in the perpendicular direction, of the holding member 180 of the connector body 150.

Figure 9:
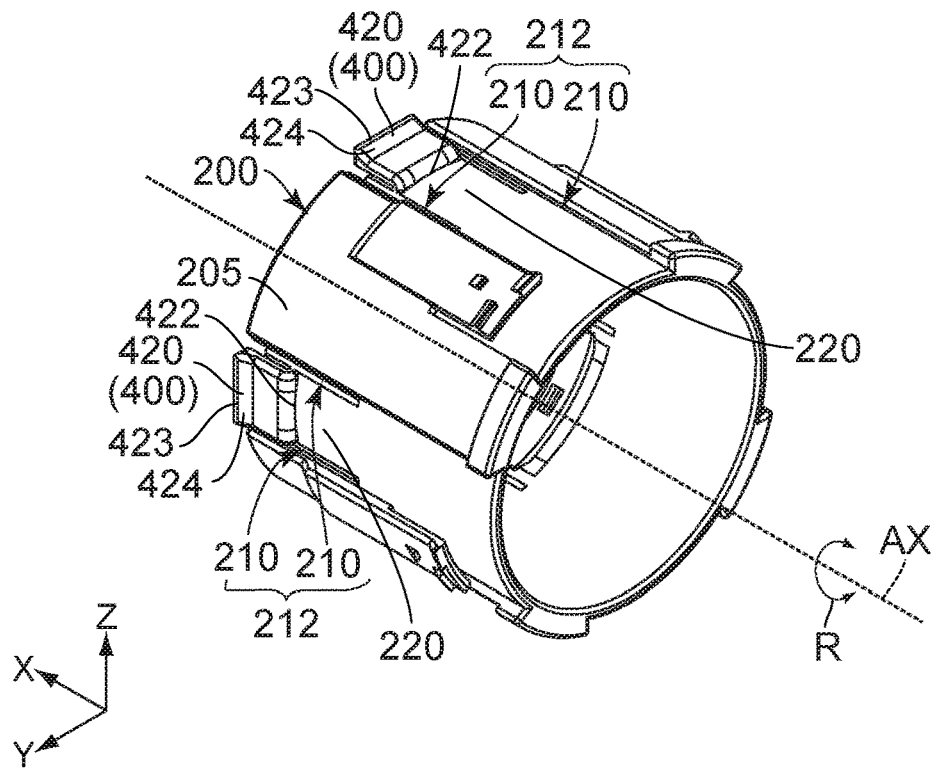
FIG. 9 is a perspective view showing the lock member which is included in the connector of the connector device of FIG. 1.
Figure 10:
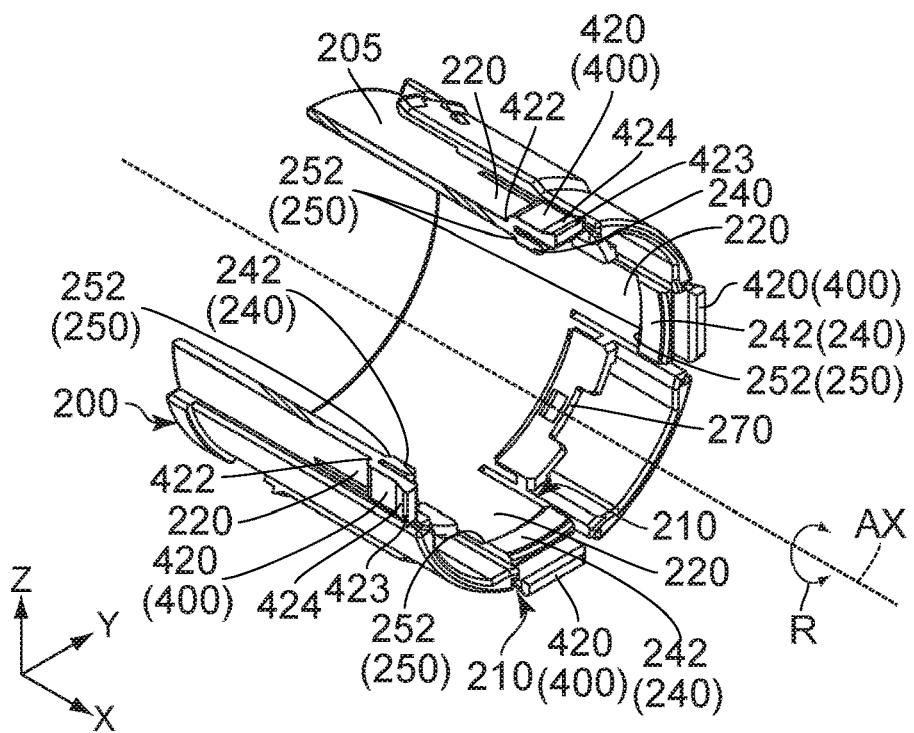
FIG. 10 is a partially cut-away, perspective view showing the lock member of FIG. 9.

As understood from FIGS. 9 and 10, the lock member 200 of the present embodiment has a peripheral wall 205, a plurality of slits 210, a plurality of supporting portions 220, a plurality of protruding portions 240, a plurality of lock portions 250, a plurality of additional elastic portions 420 and a plurality of regulated portions 270. In other words, the lock member 200 of the present embodiment has the supporting portions 220, the lock portions 250 and the additional elastic portions 420. The lock member 200 of the present embodiment is provided with the regulated portions 270. More specifically, the lock member 200 of the present embodiment has eight of the slits 210, four of the supporting portions 220, four of the protruding portions 240, four of the additional elastic portions 420 and four of the regulated portions 270.

As shown in FIGS. 9 and 10, the peripheral wall 205 of the present embodiment has a substantially cylindrical tube shape which has a center on the axis AX. Specifically, the connector 100 of the present embodiment has the axis AX which extends in the front-rear direction.

As shown in FIGS. 9 and 10, each of the slits 210 of the present embodiment is a cut extending rearward from a front end of the peripheral wall 205 of the lock member 200. More specifically, each of the slits 210 pieces the peripheral wall 205 of the lock member 200 in the perpendicular direction. Each of the slits 210 does not reach a rear end of the peripheral wall 205 of the lock member 200. The eight slits 210 of the present embodiment are grouped into four slit pairs 212 each consisting of two of the slits 210.

As shown in FIGS. 9 and 10, the supporting portion 220 of the present embodiment is a part of the peripheral wall 205, which has the substantially cylindrical tube shape, of the lock member 200. More specifically, the four supporting portions 220 corresponds to the four slit pairs 212, respectively, and each of the supporting portions 220 is positioned between the slit pair 212 corresponding thereto in a circumferential direction R of the axis AX. Each of the supporting portions 220 has an elastic property. The supporting portions 220 support the lock portions 250, respectively.

As shown in FIGS. 3 and 10, the protruding portions 240 of the present embodiment protrude inward in the perpendicular direction from the supporting portions 220, respectively. In other words, the connector 100 of the present embodiment has the protruding portions 240 which protrude inward in the perpendicular direction from the supporting portions 220, respectively. The protruding portions 240 are positioned at front ends of the supporting portions 220, respectively, in the front-rear direction. Each of the protruding portions 240 is tapered so as to have a decreasing dimension toward a front end thereof.

As shown in FIGS. 3 and 10, each of the protruding portions 240 of the present embodiment has an inner surface 242 and the lock portion 250. In other words, each of the protruding portions 240 of the present embodiment is provided with the lock portion 250.

As shown in FIG. 3, the inner surface 242 of the present embodiment is a curved surface perpendicular to the perpendicular direction. The inner surface 242 faces inward in the perpendicular direction.

As shown in FIG. 3, the lock portion 250 of the present embodiment is positioned at a rear end of the protruding portion 240 in the front-rear direction.

As understood from FIGS. 3, 9 and 10, the lock portions 250 of the present embodiment are supported by the supporting portions 220, respectively. The lock portions 250 are arranged at a constant interval in the circumferential direction R of the axis AX. Each of the lock portions 250 of the present embodiment is movable in the perpendicular direction by an elastic deformation of the supporting portion 220 corresponding thereto. However, the present invention is not limited thereto. The lock portion 250 may be modified, provided that the lock portion 250 is movable at least in the perpendicular direction by the elastic deformation of the supporting portion 220.

As shown in FIG. 3, each of the lock portions 250 of the present embodiment has an intersecting surface 252. As described above, each of the mating lock portions 660 has the intersecting surface 662. In other words, the intersecting surface 252 is provided on the lock portion 250, while the intersecting surface 662 is provided on the mating lock portion 660. The intersecting surface 252 of the lock portion 250 faces inward in the perpendicular direction and rearward in the front-rear direction. More specifically, referring to FIGS. 9 and 10, the intersecting surfaces 252 of all of the lock portions 250 are parts of a common cone surface which has a center on the axis AX.

Referring to FIGS. 3 and 10, the additional elastic portions 420 of the present embodiment are springs which extend from the supporting portions 220, respectively, in a cantilever manner.

As shown in FIG. 3, each of the additional elastic portions 420 of the present embodiment has a coupling portion 422, an inclined surface 424 and a pressed portion 423.

As shown in FIG. 3, the coupling portion 422 of the present embodiment is coupled with the supporting portion 220 corresponding thereto. The coupling portion 422 is positioned rearward of a front end of the lock portion 250 corresponding thereto in the front-rear direction.

As shown in FIG. 3, the inclined surface 424 of the present embodiment intersects with both the perpendicular direction and the front-rear direction. More specifically, the inclined surface 424 faces outward in the perpendicular direction and rearward in the front-rear direction. The inclined surface 424 is positioned forward of the coupling portion 422 in the front-rear direction.

As shown in FIG. 3, the pressed portion 423 of the present embodiment is a surface perpendicular to the perpendicular direction. The pressed portion 423 faces outward in the perpendicular direction. The pressed portion 423 is positioned at a front end of the additional elastic portion 420. The pressed portion 423 is positioned forward of the inclined surface 424 in the front-rear direction. Specifically, a front end of the inclined surface 424 is coupled with a rear end of the pressed portion 423 in the front-rear direction.

As shown in FIG. 10, each of the regulated portions 270 of the present embodiment is positioned inward of the peripheral wall 205 of the lock member 200 in the perpendicular direction. Each of the regulated portions 270 is a surface which faces forward in the front-rear direction. Referring to FIGS. 4, 5 and 10, the regulated portions 270 are positioned rearward of the regulating portions 160, respectively, of the holding member 180 of the connector body 150 in the front-rear direction.

As shown in FIG. 3, the pressing member 440 is positioned outward of the lock member 200 in the perpendicular direction. The pressing member 440 is attached to the connector body 150 so as to be movable in the front-rear direction in a space where is positioned outward of the supporting portion 220 of the lock member 200 in the perpendicular direction.

Figure 6:
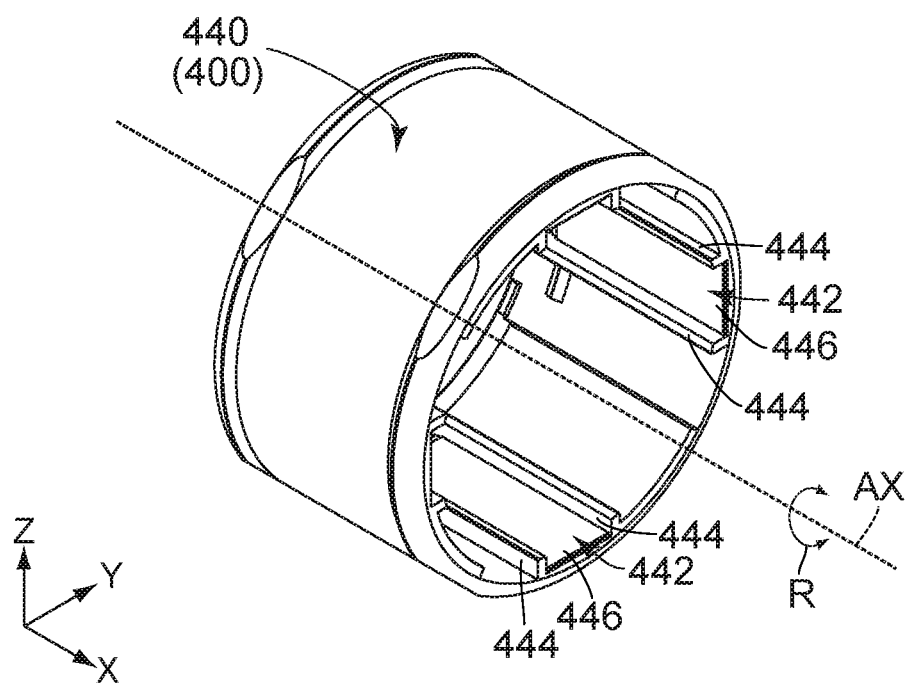
FIG. 6 is a perspective view showing the pressing member which is included in the connector of the connector device of FIG. 1.
Figure 7:
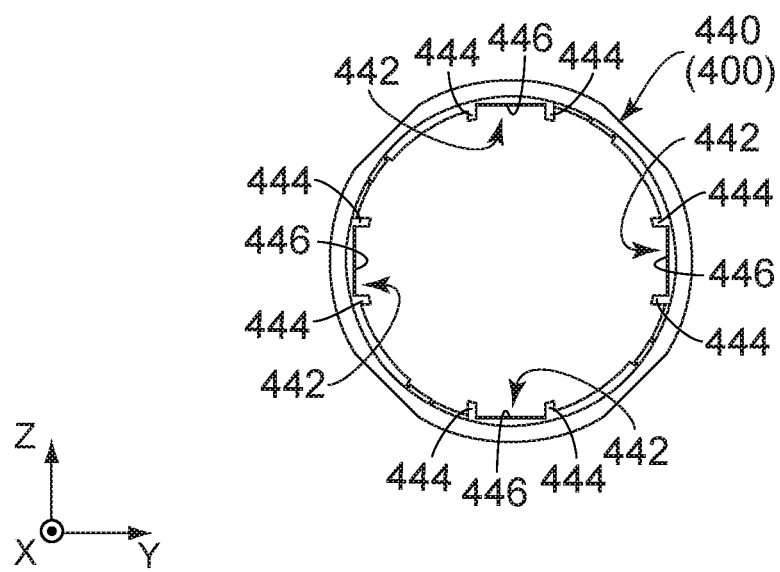
FIG. 7 is a front view showing the pressing member of FIG. 6.
Figure 8:
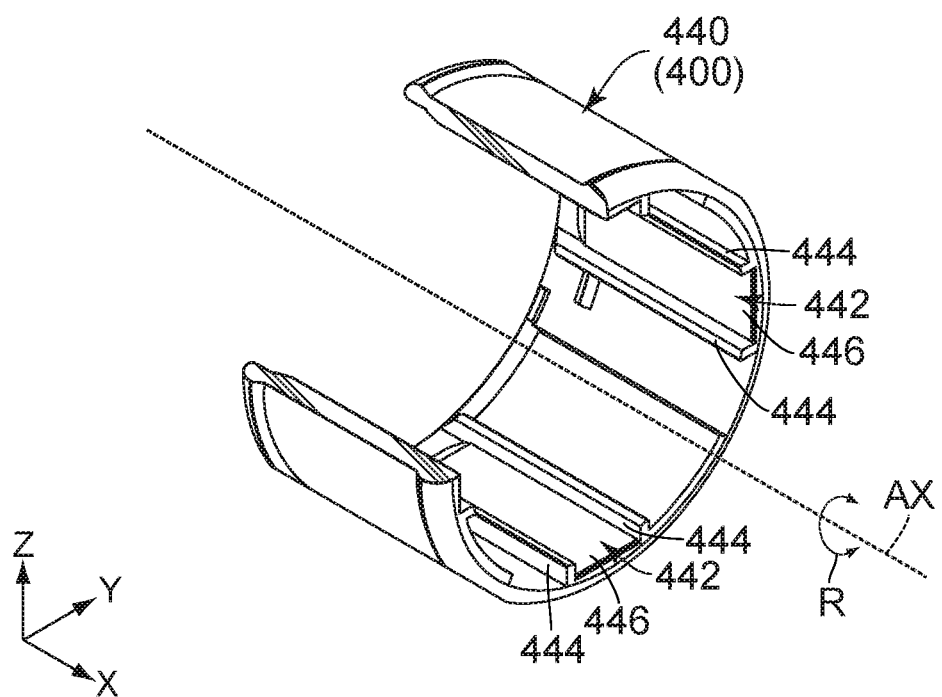
FIG. 8 is a partially cut-away, perspective view showing the pressing member of FIG. 6.

As shown in FIGS. 6 to 8, the pressing member 440 of the present embodiment has a substantially cylindrical tube shape which has a center on the axis AX. The pressing member 440 has a plurality of additional elastic portion accommodation portions 442, a plurality of partitions 444 and a plurality of press portions 446. More specifically, the pressing member 440 has four of the additional elastic portion accommodation portions 442, eight of the partitions 444 and four of the press portions 446. The four additional elastic portion accommodation portions 442 correspond to the four additional elastic portions 420, respectively, of the lock member 200. The four additional elastic portion accommodation portions 442 correspond to the four press portions 446, respectively. The eight partitions 444 are grouped into four pairs each consisting of two of the partitions 444. The four additional elastic portion accommodation portions 442 correspond to the four pairs, respectively, of the partitions 444.

As shown in FIGS. 6 to 8, each of the additional elastic portion accommodation portions 442 of the present embodiment is a space extending rearward from a front end of the pressing member 440.

As shown in FIGS. 6 to 8, each of the partitions 444 of the present embodiment extends inward in the perpendicular direction from an inner surface of the substantially cylindrical tube shape of the pressing member 440. Each of the partitions 444 extends rearward from the front end of the pressing member 440. The partitions 444 of each pair are positioned at opposite ends, respectively, of the additional elastic portion accommodation portion 442 corresponding thereto in the circumferential direction R.

As shown in FIGS. 6 to 8, each of the press portions 446 of the present embodiment is a surface perpendicular to the perpendicular direction. Each of the press portions 446 faces inward in the perpendicular direction. Each of the press portions 446 is positioned at the front end of the pressing member 440.

As described above, in the present embodiment, the lock member 200 of the connector 100 has the additional elastic portions 420 while the connector 100 has the pressing member 440. Specifically, the connector device 10 further comprises a maintaining mechanism 400 which has the additional elastic portions 420 and the pressing member 440. However, the present invention is not limited thereto. The connector device 10 may comprise no maintaining mechanism 400.

As described above, in the present embodiment, the lock member 200 has the supporting portions 220, each of the protruding portions 240 of the lock member 200 is provided with the lock portion 250, and the connector 100 comprises the receiving portion 192. In other words, the connector 100 of the present embodiment comprises the supporting portions 220, the lock portions 250 and the receiving portion 192. More specifically, the connector 100 of the present embodiment comprises the four supporting portions 220, the four lock portions 250 and the receiving portion 192. However, the present invention is not limited thereto. The connector 100 should comprise at least one of the supporting portion 220, at least one of the lock portion 250 and the receiving portion 192.

[Mating Operation]

A mating operation of the connector 100 and the mating connector 600 of the connector device 10 of the present embodiment is described below.

The connector 100 and the mating connector 600 are firstly positioned to face each other in the front-rear direction so that a front end of the cover portion 181 of the holding member 180 of the connector body 150 of the connector 100 faces the opening 682 of the cover portion accommodation portion 680 of the mating connector body 610 of the mating connector 600 as shown in FIG. 3, and the connector 100 or the mating connector 600 is moved so that the connector 100 and the mating connector 600 approach each other in the front-rear direction.

Then, the front end of each of the protruding portions 240 of the lock member 200 of the connector 100 is brought into contact with the rear end of the bulge 645 of the mating protruding portion 640 of the mating shell 630 of the mating connector body 610 of the mating connector 600, and the supporting portion 220 corresponding thereto of the lock member 200 of the connector 100 is elastically deformed so that each of the protruding portions 240 is moved outward in the perpendicular direction.

Next, when the connector 100 or the mating connector 600 is moved so that the connector 100 and the mating connector 600 further approach each other in the front-rear direction, each of the protruding portions 240 of the connector 100 rides on the bulge 645 of the mating connector 600. Specifically, the inner surface 242 of each of the protruding portions 240 of the connector 100 is brought into contact with the outer surface 647 of the bulge 645 of the mating connector 600 in the perpendicular direction.

Figure 13:
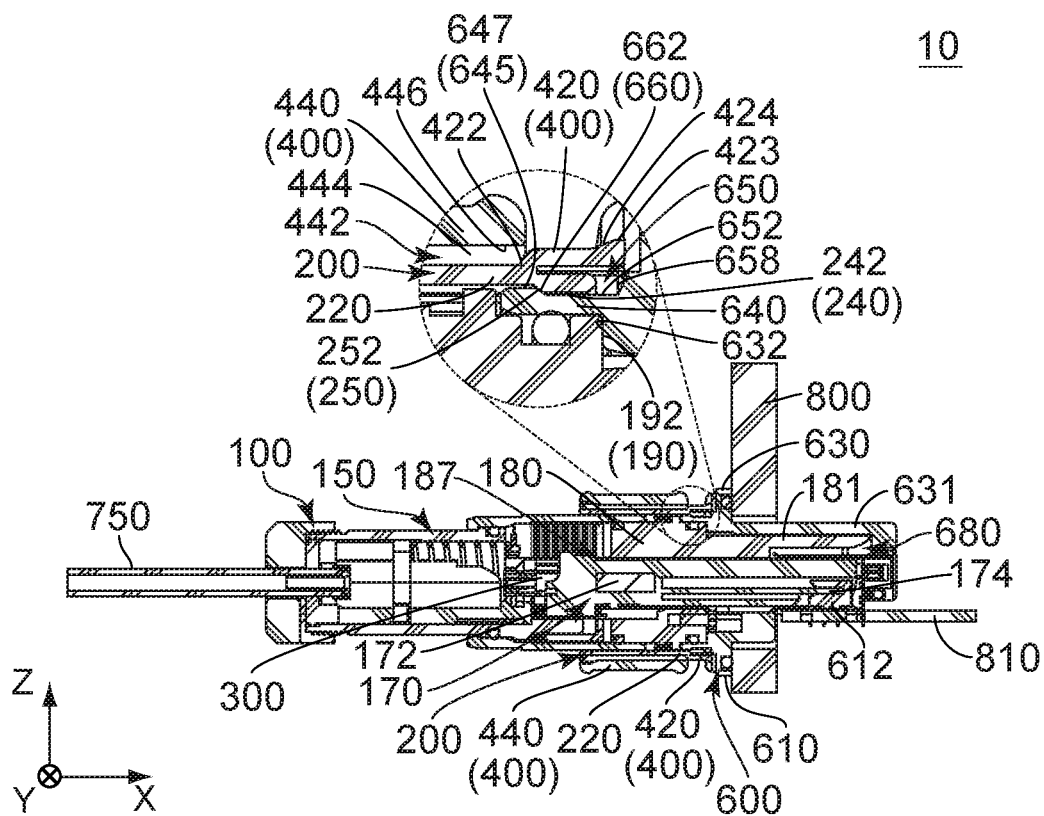
FIG. 13 is a cross-sectional view showing the connector device of FIG. 12, taken along line B-B. In the figure, parts of the connector and the mating connector are illustrated enlarged.
Figure 14:
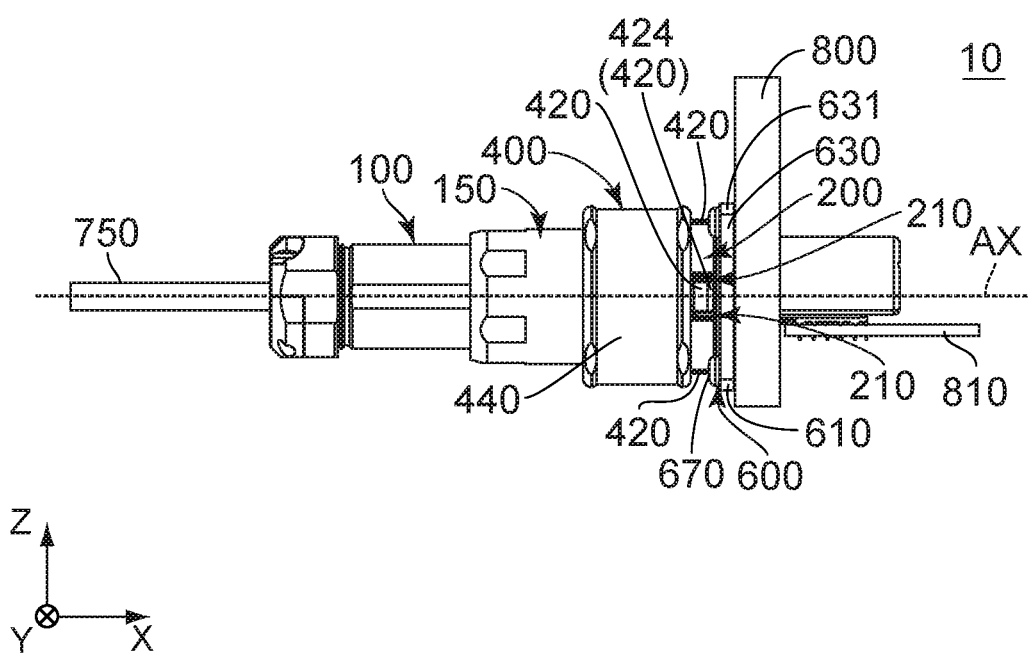
FIG. 14 is a side view showing the connector device of FIG. 11.
Figure 15:
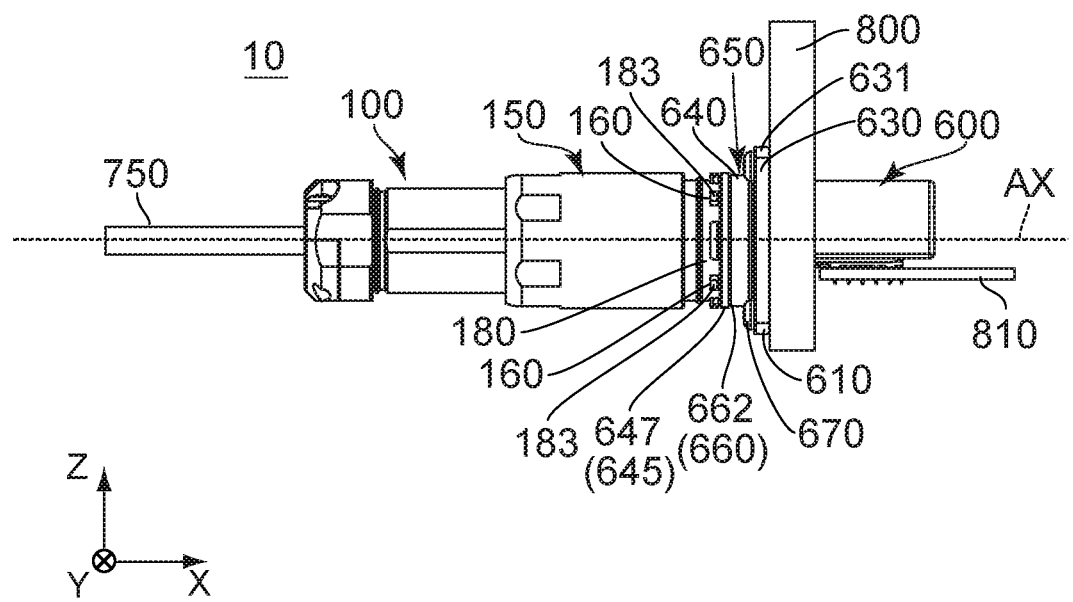
FIG. 15 is another side view showing the connector device of FIG. 14. In the figure, the pressing member and the lock member of the connector are omitted.

After that, when the connector 100 or the mating connector 600 is moved so that the connector 100 and the mating connector 600 yet further approach each other in the front-rear direction, each of the protruding portions 240 of the connector 100 is moved inward in the perpendicular direction and thereby the connector 100 and the mating connector 600 reach a first mated state (mated state) shown in FIG. 13. Specifically, the mating connector 600 is positioned forward of the connector 100 in the front-rear direction under the first mated state where the connector 100 and the mating connector 600 are mated with each other.

Under the first mated state, the cover portion 181 of the connector 100 is accommodated in the cover portion accommodation portion 680 of the mating connector 600.

Under the first mated state, the recess 650 of the mating protruding portion 640 of the mating shell 630 of the mating connector body 610 of the mating connector 600 receives, at least in part, each of the protruding portions 240 of the connector 100 while the intersecting surfaces 662 of the mating lock portions 660 of the recess 650 are positioned rearward of the protruding portions 240, respectively. At this time, each of the protruding portions 240 of the connector 100 is in contact with the recess 650 of the mating connector 600 at the intersecting surfaces 252, 662, the inner surface 242 of each of the protruding portions 240 of the connector 100 is not in contact with the bottom surface 652 of the recess 650 of the mating connector 600 in the perpendicular direction, and the front end of each of the protruding portions 240 of the connector 100 is not in contact with the front surface 658 of the recess 650 of the mating connector 600 in the front-rear direction. In other words, each of the protruding portions 240 of the connector 100 is in contact with recess 650 of the mating connector 600 only at the intersecting surfaces 252, 662. In addition, at this time, each of the supporting portions 220 of the connector 100 is not in contact with the outer surface 647 of the bulge 645 of the mating connector 600 in the perpendicular direction.

Under the first mated state, each of the supporting portions 220 of the connector 100 does not restore its original shape shown in FIG. 3 and is kept deformed elastically. Additionally, under the first mated state, the receiving portion 192 of the connector 100 is in contact with the abutment portion 632 of the mating shell 630 of the mating connector body 610 of the mating connector 600.

More specifically, under the first mated state, the mating lock portions 660 are positioned inward of the lock portions 250, respectively, in the perpendicular direction while the supporting portions 220 press the lock portions 250 against the mating lock portions 660, respectively. Additionally, under the first mated state, each of the lock portions 250 is pressed against the mating lock portion 660 corresponding thereto by the elasticity of the supporting portion 220 corresponding thereto at the intersecting surfaces 252, 662 to apply a rearward force in the front-rear direction to the mating lock portion 660 corresponding thereto. Furthermore, under the first mated state, the abutment portion 632 of the mating connector 600 is positioned forward beyond the receiving portion 192 of the connector 100 in the front-rear direction. Since the relative position between each of the mating lock portions 660 and the abutment portion 632 in the front-rear direction is fixed as described above, the rearward force applied to the mating lock portion 660 is transferred to the abutment portion 632. The abutment portion 632 cannot be, however, moved rearward beyond the receiving portion 192 by the receiving portion 192 because the abutment portion 632 of the mating connector 600 is positioned forward beyond the receiving portion 192 of the connector 100 in the front-rear direction. Specifically, under the first mated state, the abutment portion 632 of the mating connector 600 is brought into abutment against the receiving portion 192 of the connector 100 by the rearward force, which is applied to the mating lock portion 660, so that a rearward movement of the abutment portion 632 beyond the receiving portion 192 is regulated by the receiving portion 192. Accordingly, the connector device 10 of the present embodiment is configured to prevent the connector 100 from being moved in the front-rear direction relative to the mating connector 600 even if an external force in the front-rear direction is applied to the connector 100 or to the mating connector 600 under the first mated state.

In particular, as described above, the connector device 10 of the present embodiment is configured so that the lock portions 250 are arranged at the constant interval in the circumferential direction R of the axis AX while the intersecting surfaces 252 of all of the lock portions 250 are the parts of the common cone surface which has the center on the axis AX. Accordingly, a resultant force, which is produced by combining forces applied to the intersecting surfaces 252 of the lock portions 250 upon the mating of the connector 100 with the mating connector 600, has only a component in the front-rear direction because components of the forces in a direction perpendicular to the axis AX are counteracted. Thus, axes of the connector 100 and the mating connector 600 are never misaligned with respect to each other under the first mated state.

Under the first mated state, each of the regulated portions 270 of the lock member 200 is in contact with the regulating portion 160 corresponding thereto of the connector body 150. More specifically, when the lock portion 250 of the connector 100 applies the rearward force to the mating lock portion 660 corresponding thereto of the mating connector 600 under the first mated state, the lock portion 250 receives a forward force as a reaction force from the mating lock portion 660 corresponding thereto so that the regulated portion 270 is pressed against the regulating portion 160 corresponding thereto by the forward force which the lock portion 250 receives. Thus, relative movements of the lock member 200 and the connector body 150 with respect to each other are regulated.

Under the first mated state, the maintaining mechanism 400 is positioned outward beyond any of the supporting portions 220 in the perpendicular direction while the pressing member 440 is positioned rearward of any of the additional elastic portions 420 of the lock member 200.

Under the first mated state, the terminals 500 of the connector 100 are connected with the mating terminals 700, respectively, of the mating electrical connector 612 of the mating connector body 610 of the mating connector 600. Specifically, under the first mated state, each of the terminals 500 of the connector 100 is brought into electrical contact with the mating terminal 700 corresponding thereto of the mating connector 600.

When the pressing member 440 is moved forward in the front-rear direction relative to the connector body 150 under the first mated state shown in FIG. 13, each of the additional elastic portions 420 of the lock member 200 is accommodated in the additional elastic portion accommodation portion 442 corresponding thereto of the pressing member 440 while the inclined surfaces 424 of the additional elastic portions 420 of the lock member 200 are brought into contact with front ends of the press portions 446, respectively, of the pressing member 440.

Figure 18:
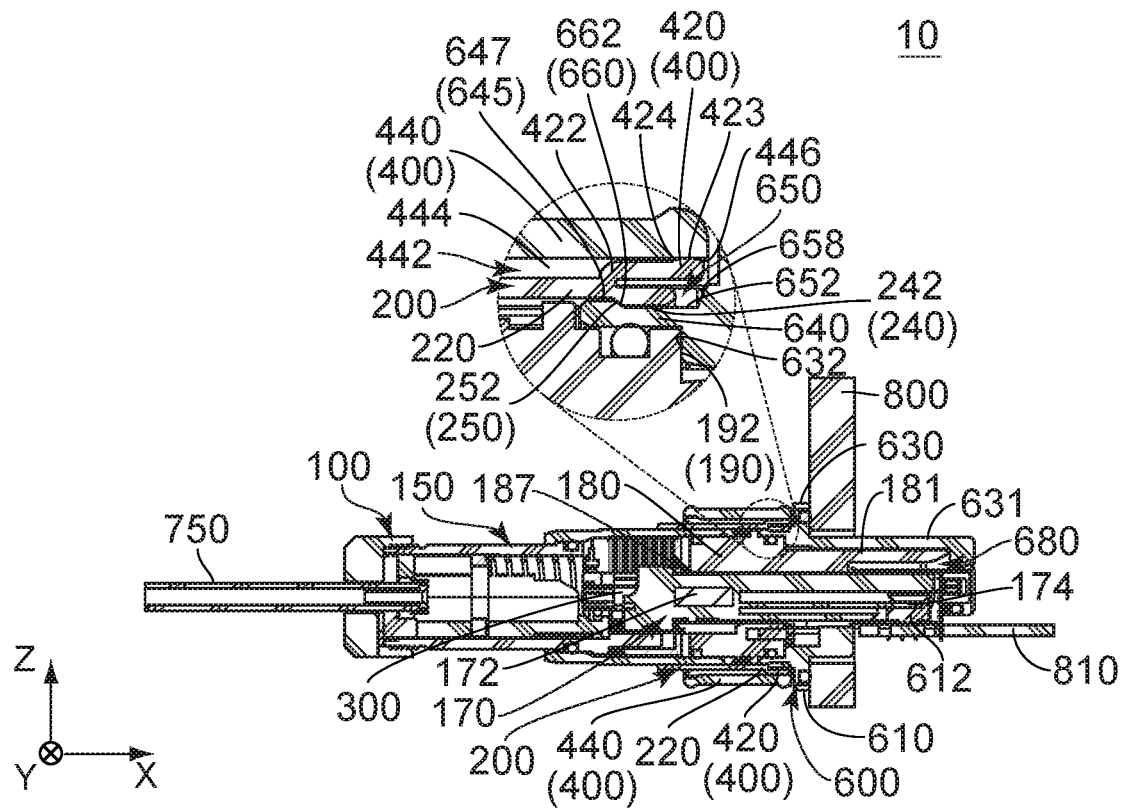
FIG. 18 is a cross-sectional view showing the connector device of FIG. 17, taken along line C-C. In the figure, parts of the connector and the mating connector are illustrated enlarged.
Figure 19:
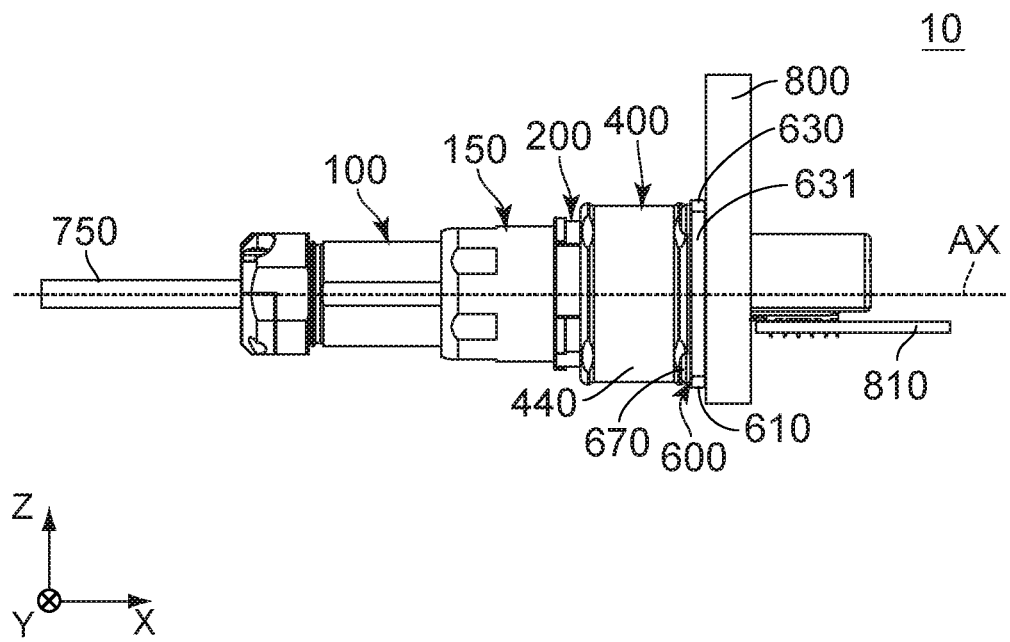
FIG. 19 is a side view showing the connector device of FIG. 16.
Figure 20:
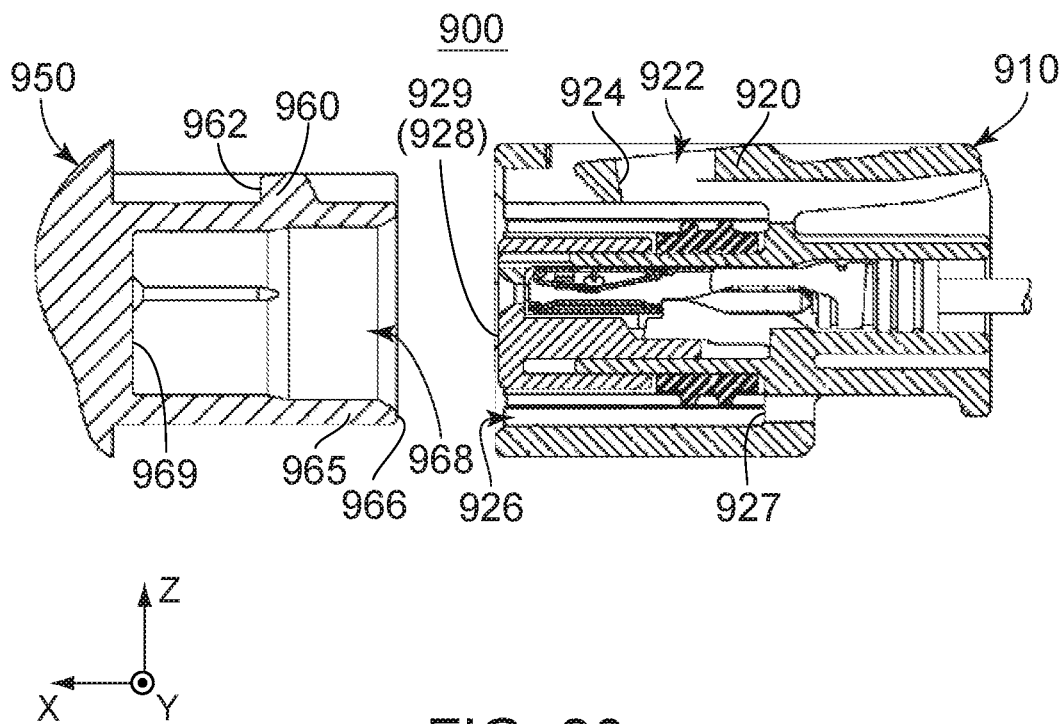
FIG. 20 is a cross-sectional view showing a connector device of Patent Document 1. In the figure, a connector and a mating connector, which are included in the connector device, are not mated with each other.
Figure 21:
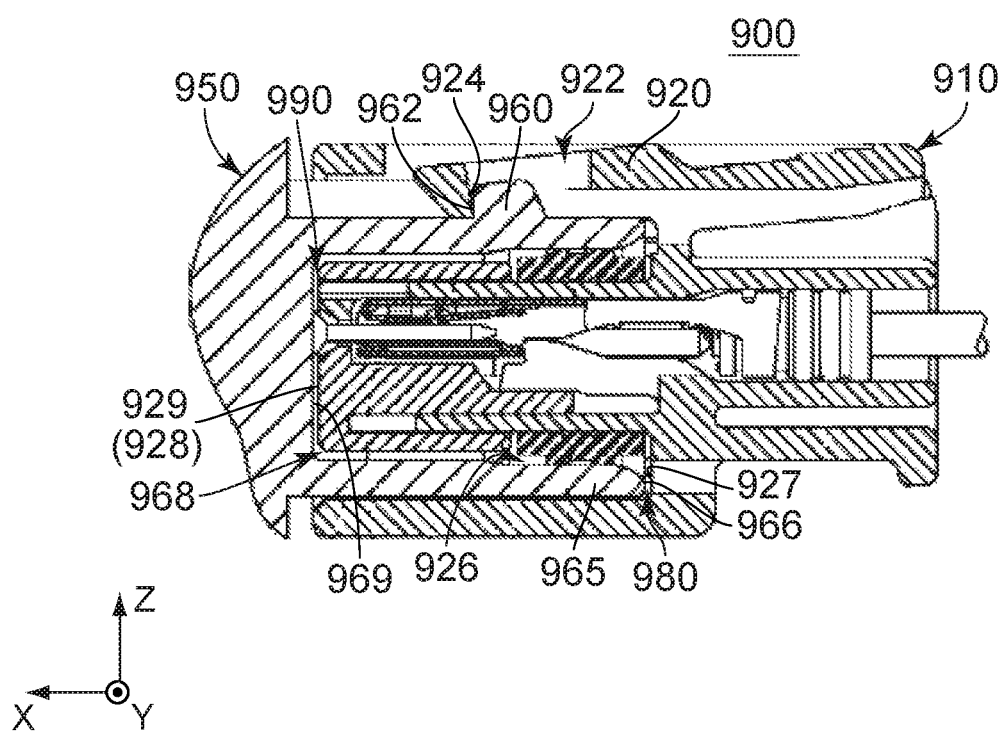
FIG. 21 is another cross-sectional view showing the connector device of FIG. 20. In the figure, the connector and the mating connector are mated with each other.

After that, when the pressing member 440 is further moved forward in the front-rear direction relative to the connector body 150, the connector 100 and the mating connector 600 reach a second mated state (mated state) shown in FIG. 18. Specifically, the mating connector 600 is positioned forward of the connector 100 in the front-rear direction under the second mated state where the connector 100 and the mating connector 600 are mated with each other.

Under the second mated state, the recess 650 of the mating protruding portion 640 of the mating shell 630 of the mating connector body 610 of the mating connector 600 receives, at least in part, each of the protruding portions 240 of the connector 100 while each of the intersecting surfaces 662 of the mating lock portions 660 of the recess 650 is positioned rearward of the protruding portion 240 corresponding thereto. At this time, each of the protruding portions 240 of the connector 100 is in contact with the recess 650 of the mating connector 600 at the intersecting surfaces 252, 662, the inner surface 242 of each of the protruding portions 240 of the connector 100 is not in contact with the bottom surface 652 of the recess 650 of the mating connector 600 in the perpendicular direction, and the front end of each of the protruding portions 240 of the connector 100 is not in contact with the front surface 658 of the recess 650 of the mating connector 600 in the front-rear direction. In other words, each of the protruding portions 240 of the connector 100 is in contact with the recess 650 of the mating connector 600 only at the intersecting surfaces 252, 662. In addition, at this time, each of the supporting portions 220 of the connector 100 is not in contact with the outer surface 647 of the bulge 645 of the mating connector 600 in the perpendicular direction.

Under the second mated state, each of the supporting portions 220 of the connector 100 does not restore its original shape shown in FIG. 3 and is kept deformed elastically. Additionally, under the second mated state, the receiving portion 192 of the connector 100 is in contact with the abutment portion 632 of the mating shell 630 of the mating connector body 610 of the mating connector 600.

More specifically, under the second mated state, each of the mating lock portions 660 is positioned inward of the lock portion 250 corresponding thereto in the perpendicular direction while each of the supporting portions 220 presses the lock portion 250 corresponding thereto against the mating lock portion 660 corresponding thereto. Under the second mated state, each of the lock portions 250 is pressed against the mating lock portion 660 corresponding thereto at the intersecting surfaces 252, 662 by the elasticity of the supporting portion 220 corresponding thereto to apply a rearward force in the front-rear direction to the mating lock portion 660 corresponding thereto. Under the second mated state, the abutment portion 632 of the mating connector 600 is positioned forward beyond the receiving portion 192 of the connector 100 in the front-rear direction. Since the relative position between each of the mating lock portions 660 and the abutment portion 632 in the front-rear direction is fixed as described above, the rearward force applied to the mating lock portion 660 is transferred to the abutment portion 632. The abutment portion 632 cannot be, however, moved rearward beyond the receiving portion 192 by the receiving portion 192 because the abutment portion 632 of the mating connector 600 is positioned forward beyond the receiving portion 192 of the connector 100 in the front-rear direction. In other words, under the second mated state, the abutment portion 632 of the mating connector 600 is brought into abutment against the receiving portion 192 of the connector 100 by the rearward force, which is applied to the mating lock portion 660, so that a rearward movement of the abutment portion 632 beyond the receiving portion 192 is regulated by the receiving portion 192. Accordingly, the connector device 10 of the present embodiment is configured to prevent the connector 100 from being moved in the front-rear direction relative to the mating connector 600 even if an external force in the front-rear direction is applied to the connector 100 or to the mating connector 600 under the second mated state.

In particular, as described above, the connector device 10 of the present embodiment is configured so that the lock portions 250 are arranged at the constant interval in the circumferential direction R of the axis AX while the intersecting surfaces 252 of all of the lock portions 250 are the parts of the common cone surface which has the center on the axis AX. Accordingly, a resultant force, which is produced by combining forces applied to the intersecting surfaces 252 of the lock portions 250 upon the mating of the connector 100 with the mating connector 600, has only a component in the front-rear direction because components of the forces in the direction perpendicular to the axis AX are counteracted. Thus, the axes of the connector 100 and the mating connector 600 are never misaligned with respect to each other under the second mated state.

Under the second mated state, each of the regulated portions 270 of the lock member 200 is in contact with the regulating portion 160 corresponding thereto of the connector body 150. More specifically, when the lock portion 250 of the connector 100 applies a rearward force to the mating lock portion 660 corresponding thereto of the mating connector 600 under the second mated state, the lock portion 250 receives a forward force as a reaction force from the mating lock portion 660 corresponding thereto so that the regulated portion 270 is pressed against the regulating portion 160 corresponding thereto by the forward force which the lock portion 250 receives. Thus, the relative movements of lock member 200 and connector body 150 with respect to each other are regulated.

In particular, as described above, the intersecting surfaces 252 of all of the lock portions 250 are the parts of the common cone surface which has the center on the axis AX. Accordingly, the resultant force, which is produced by combining the forces applied to the intersecting surfaces 252 of the lock portions 250 upon the mating of the connector 100 with the mating connector 600, has only the component in the front-rear direction because the components of the forces in the direction perpendicular to the axis AX are counteracted. Thus, the axes of the connector 100 and the mating connector 600 are never misaligned with respect to each other under the second mated state.

Under the second mated state, the maintaining mechanism 400 is positioned outward beyond any of the supporting portions 220 in the perpendicular direction and presses the supporting portions 220 to maintain a state where each of the supporting portions 220 presses the lock portion 250 corresponding thereto against the mating lock portion 660 corresponding thereto. Under the second mated state, each of the additional elastic portions 420 is positioned between the supporting portion 220 corresponding thereto and the pressing member 440 in the perpendicular direction and applies an inward force in the perpendicular direction to the supporting portion 220 corresponding thereto.

More specifically, under the second mated state, each of the press portions 446 of the pressing member 440 is in contact with the pressed portion 423 of the additional elastic portion 420 corresponding thereto of the lock member 200 and presses the additional elastic portion 420 corresponding thereto of the lock member 200 from the outside in the perpendicular direction.

Under the second mated state, each of the terminals 500 of the connector 100 is connected with the mating terminal 700 corresponding thereto of the mating electrical connector 612 of the mating connector body 610 of the mating connector 600. Specifically, under the second mated state, each of the terminals 500 of the connector 100 is brought into electrical contact with the mating terminal 700 corresponding thereto of the mating connector 600.

[Release Operation to Release the Mating]

In the connector device 10 of the present embodiment, the mating of the connector 100 with the mating connector 600 can be released by an operation reverse to the aforementioned mating operation of the connector 100 with the mating connector 600.

Although the specific explanation about the present invention is made above referring to the embodiments, the present invention is not limited thereto and is susceptible to various modifications and alternative forms.

Although the connector device 10 of the present embodiment is configured so that the terminals 500 of the connector 100 are brought into electrical contact with the mating terminals 700 of the mating connector 600, the present invention is applicable to an optical connector device which has no electrical contact. Specifically, if an optical connector device has a clearance between an optical connector and a mating optical connector when the optical connector and the mating optical connector are mated with each other, the optical connector might be moved relative to the mating optical connector in a front-rear direction. Accordingly, debris such as shavings or the like might be produced in the optical connector device and thereby the optical connector device might have a degraded connection therebetween. In contrast, an optical connector device, to which the present invention is applied, has no drawback as described above.

Although the connector device 10 of the present embodiment does not comprise a coupling nut which maintains the mated state of the connector 100 with the mating connector 600, the present invention is not limited thereto. The connector device 10 may comprise a coupling nut which maintains the mated state of the connector 100 with the mating connector 600.

Although the maintaining mechanism 400 of the connector device 10 of the present embodiment comprises the additional elastic portions 420, the present invention is not limited thereto. Specifically, the maintaining mechanism 400, instead of comprising the additional elastic portions 420, may be configured so that the inner surface of the pressing member 440 is provided with a bulged portion which is bulged inward in the perpendicular direction and prevents an outward movement of the lock portion 250 of the lock member 200 in the perpendicular direction. In detail, the bulged portion, which is provided on the inner surface of the pressing member 440 and is bulged inward in the perpendicular direction, may be formed as an annular elastic portion, wherein the annular elastic portion is made of rubber or the like, the annular elastic portion is attached on the inner surface of the pressing member 440, and the annular elastic portion functions similar to the additional elastic portion 420. If the connector device 10 comprises the aforementioned coupling nut, the connector device 10, instead of comprising the maintaining mechanism 400, may be configured so that an inner surface of the coupling nut is provided with a bulged portion which is bulged inward in the perpendicular direction and prevents the outward movement of the lock portion 250 of the lock member 200 in the perpendicular direction.

Although the connector device 10 of the present embodiment comprises the maintaining mechanism 400, the present invention is not limited thereto. Specifically, the maintaining mechanism 400 may be omitted, provided that the supporting portion 220 of the lock member 200 of the connector 100 has a sufficient spring force.

Although the connector device 10 of the present embodiment is configured so that, under each of the first mated state and the second mated state, each of the mating lock portions 660 is positioned inward of the lock portion 250 corresponding thereto in the perpendicular direction while the maintaining mechanism 400 is positioned outward beyond any of the supporting portions 220 in the perpendicular direction, the present invention is not limited thereto. Specifically, the connector device 10 may be configured so that, under each of the first mated state and the second mated state, the mating lock portion 660 is positioned outward of the lock portion 250 in the perpendicular direction while the maintaining mechanism 400 is positioned inward beyond the supporting portion 220 in the perpendicular direction.

Although the connector device 10 of the present embodiment is configured so that the intersecting surface 252 is provided on the lock portion 250 while the intersecting surface 662 is provided on the mating lock portion 660, the present invention is not limited thereto. At least one of the lock portion 250 and the mating lock portion 660 should have the intersecting surface 252, 662 which intersects with both the front-rear direction and the perpendicular direction. However, if a connector device 10 is configured similar to the present embodiment in that the lock portion 250 has the intersecting surface 252 while the mating lock portion 660 has the intersecting surface 662, the connector device 10 has an advantage as follows: even if the intersecting surface 252, 662 has a manufacturing variation or is abraded, one of the intersecting surfaces 252 and 662 makes a point or line contact with a remaining one of the intersecting surfaces 252 and 662 so that a force is reliably transferred between the lock portion 250 and the mating lock portion 660. Accordingly, the lock portion 250 and the mating lock portion 660 of the present embodiment are more preferable.

The present application is based on a Japanese patent application of JP2018-116026 filed before the Japan Patent Office on Jun. 19, 2018, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10 connector device
100 connector
150 connector body
160 regulating portion (rear surface)
170 optical module
172 photoelectric conversion portion
174 electrical connector
180 holding member
181 cover portion
183 protrusion
187 optical module accommodation portion
190 extending portion
192 front surface (receiving portion)
200 lock member
205 peripheral wall
210 slit
212 slit pair
220 supporting portion
240 protruding portion
242 inner surface
250 lock portion
252 intersecting surface
270 regulated portion
300 optical connector
400 maintaining mechanism
420 additional elastic portion
422 coupling portion
423 pressed portion
424 inclined surface
440 pressing member
442 additional elastic portion accommodation portion
444 partition
446 press portion
500 terminal
600 mating connector
610 mating connector body
612 mating electrical connector
630 mating shell
631 mating shell body
632 abutment portion
640 mating protruding portion
645 bulge
647 outer surface
650 recess
652 bottom surface
658 front surface
660 mating lock portion
662 intersecting surface (rear surface, end surface)
670 fixing screw
680 cover portion accommodation portion
682 opening
700 mating terminal
750 optical fiber cable
800 housing
810 circuit board
AX axis
R circumferential direction
D distance

The invention claimed is:

1. A connector device comprising a connector and a mating connector, wherein:
the mating connector is mateable with and removable from the connector along a front-rear direction;
under a mated state where the connector and the mating connector are mated with each other, the mating connector is positioned forward of the connector in the front-rear direction;
the connector comprises at least one supporting portion, at least one lock portion and a receiving portion;
the supporting portion has an elastic property and supports the lock portion;
the lock portion is movable at least in a perpendicular direction by an elastic deformation of the supporting portion;
the perpendicular direction is perpendicular to the front-rear direction;
the mating connector has at least one mating lock portion and an abutment portion;
a relative position between the mating lock portion and the abutment portion in the front-rear direction is fixed in the mating connector;
at least one of the lock portion and the mating lock portion has an intersecting surface which intersects with both the front-rear direction and the perpendicular direction;
under the mated state, the lock portion is pressed against the mating lock portion by the elasticity of the supporting portion at the intersecting surface to apply a rearward force in the front-rear direction to the mating lock portion;
under the mated state, the abutment portion is positioned forward beyond the receiving portion in the front-rear direction and is brought into abutment against the receiving portion by the rearward force so that a rearward movement of the abutment portion beyond the receiving portion is regulated by the receiving portion; and the mating lock portion is positioned rearward of the abutment portion in the front-rear direction.

2. The connector device as recited in claim 1, wherein under the mated state, the mating lock portion is positioned inward of the lock portion in the perpendicular direction and the supporting portion presses the lock portion against the mating lock portion.

3. The connector device as recited in claim 2, wherein:
the connector device further comprises a maintaining mechanism; and
under the mated state, the maintaining mechanism is positioned outward beyond the supporting portion in the perpendicular direction and presses the supporting portion to maintain a state where the supporting portion presses the lock portion against the mating lock portion.

4. The connector device as recited in claim 3, wherein:
the maintaining mechanism comprises an additional elastic portion and a pressing member; and
under the mated state, the additional elastic portion is positioned between the supporting portion and the pressing member in the perpendicular direction and applies an inward force in the perpendicular direction to the supporting portion.

5. The connector device as recited in claim 4, wherein:
the connector comprises a connector body and a lock member in addition to the pressing member;
the lock member is attached to the connector body;
the lock member has the supporting portion, the lock portion and the additional elastic portion;
the additional elastic portion is a spring which extends from the supporting portion in a cantilever manner; and
the pressing member is attached to the connector body so as to be movable in the front-rear direction in a space which is positioned outward of the supporting portion in the perpendicular direction.

6. The connector device as recited in claim 5, wherein:
the connector body is provided with a regulating portion;
the lock member is provided with a regulated portion;
the regulated portion is positioned rearward of the regulating portion in the front-rear direction;
when the lock portion applies the rearward force to the mating lock portion under the mated state, the lock portion receives a forward force as a reaction force transferred from the mating lock portion; and
the regulated portion is pressed against the regulating portion by the forward force so that relative movements of the lock member and the connector body with respect to each other are regulated.

7. The connector device as recited in claim 5, wherein:
the connector body comprises an optical module and a holding member;
the optical module has a photoelectric conversion portion and an electrical connector;
the holding member holds the optical module;
the holding member has an extending portion which extends in a direction perpendicular to the front-rear direction;
the extending portion has a front surface facing forward in the front-rear direction;
the front surface of the extending portion functions as the receiving portion;

the mating connector comprises a mating connector body;
the mating connector body has a mating shell;
the mating shell is formed with the abutment portion; and
under the mated state, the receiving portion and the abutment portion are in contact with each other.

8. The connector device as recited in claim 7, wherein:
the mating shell is attached to a housing when the connector device is used;
the mating shell has a mating protruding portion;
the mating protruding portion is provided so as to be positioned outside the housing when the mating shell is attached to the housing;
the mating connector body has a mating electrical connector; and
when the connector device is used, the mating electrical connector is fixed on a circuit board which is arranged in the housing.

9. The connector device as recited claim 2, wherein:
the connector comprises a plurality of the supporting portions and a plurality of the lock portions;
the lock portions are supported by the supporting portions, respectively;
the connector has an axis which extends in the front-rear direction; and
the lock portions are arranged at a constant interval in a circumferential direction of the axis.

10. The connector device as recited in claim 9, wherein:
each of the lock portions has the intersecting surface; and
the intersecting surfaces of all of the lock portions are parts of a common cone surface which has a center on the axis.

11. The connector device as recited in claim 1, wherein the intersecting surface is provided on both of the lock portion and the mating lock portion.

12. The connector device as recited in claim 11, wherein:
the connector has a protruding portion which protrudes inward in the perpendicular direction from the supporting portion;
the lock portion is provided on the protruding portion;
the intersecting surface of the lock portion faces inward in the perpendicular direction and rearward in the front-rear direction;
the mating connector has a recess;
under the mated state, the recess receives, at least in part, the protruding portion;
the mating lock portion is provided on the recess;
the intersecting surface of the mating lock portion is a surface of the recess, the surface of the recess being positioned rearward of the protruding portion in the front-rear direction under the mated state; and
the intersecting surface of the mating lock portion faces outward in the perpendicular direction and forward in the front-rear direction.

13. The connector device as recited in claim 1, wherein:
the connector has a terminal;
the mating connector has a mating terminal; and
under the mated state, the terminal is connected with the mating terminal.

14. The connector used for the connector device as recited in claim 1.

15. The mating connector used for the connector device as recited in claim 1.

* * * * *

UNITED STATES PATENT AND TRADEMARK OFFICE
CERTIFICATE OF CORRECTION

| | |
|---|---|
| PATENT NO. | : 11,336,056 B2 |
| APPLICATION NO. | : 17/044978 |
| DATED | : May 17, 2022 |
| INVENTOR(S) | : Koreeda et al. |

It is certified that error appears in the above-identified patent and that said Letters Patent is hereby corrected as shown below:

On the Title Page

On Page 2, item (56), under References Cited, FOREIGN PATENT DOCUMENTS, change "JP 2005005135 A* 1/2005" to --JP 2005-005135 A* 1/2005--

In the Specification

In Column 5, Line 16: change "showing" to --shown--

In Column 8, Line 5: change "connects" to --connect--

In Column 10, Line 25: after "where" insert --it--

Signed and Sealed this
Sixth Day of September, 2022

Katherine Kelly Vidal
*Director of the United States Patent and Trademark Office*